US011180206B2

(12) United States Patent
Nguyen et al.

(10) Patent No.: US 11,180,206 B2
(45) Date of Patent: Nov. 23, 2021

(54) MOBILE CART AND METHODS OF HANDLING VEHICLE PARTS THEREWITH

(71) Applicant: Honda Motor Co., Ltd., Tokyo (JP)

(72) Inventors: Khoi Nguyen, Newmarket (CA); Samantha Alys Marie Briley, London (CA); Ryan William Hague, Kingston (CA)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 16/813,854

(22) Filed: Mar. 10, 2020

(65) Prior Publication Data

US 2021/0284261 A1   Sep. 16, 2021

(51) Int. Cl.
*B62D 65/02* (2006.01)
*B62D 65/18* (2006.01)
*B62B 3/04* (2006.01)

(52) U.S. Cl.
CPC ........... *B62D 65/022* (2013.01); *B62D 65/18* (2013.01); *B62B 3/04* (2013.01)

(58) Field of Classification Search
CPC . B62D 65/18; B62D 65/022; Y10T 29/49819; Y10T 29/49828; Y10T 29/49829; Y10T 29/53543; Y10T 29/53548
See application file for complete search history.

(56) References Cited

FOREIGN PATENT DOCUMENTS

| CN | 206344855 U | 7/2017 |
|----|-------------|--------|
| CN | 207360384 U | 5/2018 |
| KR | 19980013955 U | 6/1998 |
| KR | 101703024 B1 | 2/2017 |

OTHER PUBLICATIONS

CN-207360384-U english translation (Year: 2018).*
Trolleys and Material Handling Equipment, Jay Brown Steel, available at http://www.jaybrown.co.za/prodserv-trolleys.html, last visited Feb. 26, 2020; 11 pp.

* cited by examiner

*Primary Examiner* — Jason L Vaughan
*Assistant Examiner* — Amanda Kreiling
(74) *Attorney, Agent, or Firm* — Armstrong Teasdale LLP

(57) ABSTRACT

A mobile cart for use in handling vehicle parts, that includes a base subassembly including a first side and a second side, and a storage subassembly coupled to the base subassembly. The storage subassembly includes a first row of swing arms extending along the first side, and a second row of swing arms extending along the second side. The swing arms in the first row and the second row are positionable between an upright position and a lowered position. When in the upright position, a first slot is defined between each swing arm in the first row, and a second slot is defined between each swing arm in the second row, such that a respective first slot is axially aligned with a respective second slot relative to the mobile cart such that a plurality of retention slots are defined that are oriented and sized to receive a vehicle part therein.

19 Claims, 9 Drawing Sheets

MOBILE CART AND METHODS OF HANDLING VEHICLE PARTS THEREWITH

BACKGROUND

The present disclosure relates generally to vehicle manufacturing and, more specifically, to a mobile cart for use in providing ergonomic handling of vehicle parts used in vehicle manufacturing.

During the manufacture or assembly of a vehicle body, at least some known manufacturing plants include a number of different stations where vehicle parts or subassemblies are formed. Once formed, the vehicle parts may be transported to an assembly line for assembling the vehicle parts on the vehicle. Vehicle panels, such as hood skins, are typically transported from a particular station to the body assembly line via a delivery system. Common delivery systems include mobile carts that are designed to hold multiple panels, and that enable the panels to be transported to the assembly line with minimal risk of damage to the panels. Accordingly, some known mobile carts include multiple or adjustable compartments sized to receive different individual panels therein.

During assembly of the vehicle body, the vehicle panels may require manual labor to be removed from the compartments. In addition, the vehicle panels are typically formed of multiple low carbon steel or steel-based alloy sub-parts that are welded together, thereby increasing the weight of the panels and/or the size of the panel assembly. Ergonomics are an important consideration in many modern manufacturing plants. Accordingly, manually loading and/or unloading the vehicle panels from the compartments, especially from compartments located at ergonomically awkward positions, may increase strain induced to the technicians and/or the risk of injury. Reducing strain, potentially harmful repetitive motions, and injuries is an ongoing concern in manufacturing settings.

BRIEF DESCRIPTION

In one aspect, a mobile cart for use in handling vehicle parts is provided. The mobile cart includes a base subassembly including a first side and a second side, and a storage subassembly coupled to the base subassembly. The storage subassembly includes a first row of swing arms extending along the first side of the base subassembly, and a second row of swing arms extending along the second side of the base subassembly. The swing arms in the first row and the second row are selectively positionable between an upright position and a lowered position. When in the upright position, a first slot is defined between each swing arm in the first row, and a second slot is defined between each swing arm in the second row, such that a respective first slot is axially aligned with a respective second slot relative to the mobile cart such that a plurality of retention slots are defined that are oriented and sized to receive a vehicle part therein.

In another aspect, a mobile cart for use in handling vehicle parts is provided. The mobile cart includes a first rail extending along a first side of the mobile cart, a first row of swing arms coupled to the first rail, a second rail extending along a second side of the mobile cart, and a second row of swing arms coupled to the second rail. The swing arms in the first row and the second row are selectively positionable between an upright position and a lowered position. A plurality of stoppers is coupled to the first rail and the second rail, wherein a respective stopper is associated with each swing arm. The respective stopper and a portion of each respective swing arm define contact points configured to retain a vehicle part therebetween.

In yet another aspect, a method of handling vehicle parts is provided. The method includes loading a plurality of vehicle parts onto a mobile cart. Each vehicle part is positioned within a respective retention slot of a plurality of retention slots on the mobile cart, the plurality of retention slots defined by a plurality of swings arms in an upright position and arranged in a first row and a second row on the mobile cart. A first slot is defined between each swing arm in the first row, and a second slot is defined between each swing arm in the second row. A respective first slot is axially aligned with a respective second slot along the mobile cart to define the plurality of retention slots. The method also includes unloading a first vehicle part from the mobile cart, the first vehicle part positioned within a first retention slot, and positioning the swing arms associated with the first retention slot from the upright position to a lowered position to provide access to a second vehicle part positioned within a second retention slot positioned adjacent to the first retention slot.

DETAILED DESCRIPTION

The embodiments described herein relate generally to a mobile cart for use in providing ergonomic handling of vehicle parts used in vehicle manufacturing. The mobile cart described herein may include a plurality of swing arms arranged in rows on respective sides of the cart. Each swing arm is selectively positionable between an upright position and a lowered position. When in the upright position, swing arms in a first row and a second row are spaced from each other such that first slots are defined between adjacent swing arms in the first row, and such that second slots are defined between adjacent swing arms in the second row. The first and second slots substantially align to define a plurality of retention slots on the cart. Each retention slot is sized to receive a vehicle part, such as a hood panel or a door panel, for storing and/or transporting the vehicle parts within a manufacturing facility.

For example, the vehicle parts may be loaded onto the cart at a substation in which the parts are assembled, and then transported to a body assembly line. At the body assembly line, the assembled parts may be unloaded by technicians for assembly on a vehicle body. In the exemplary embodiment, the mobile cart includes features that facilitate enhancing ergonomic efficiency for the technicians performing the unloading process. For example, the cart includes a platform in which the vehicle parts are initially received. The platform is located at an ergonomically efficient height from ground level. In addition, during operation, a first vehicle part may be unloaded from the cart, and then respective swing arms in the first and second rows that are associated with the first vehicle part may be lowered to provide unimpeded access to the next vehicle part on the cart. The process of unloading a part and selectively lowering the swing arms may be repeated until each vehicle part is removed from the cart. Accordingly, the mobile cart facilitates reducing workplace injuries to the technicians.

Figure 1:
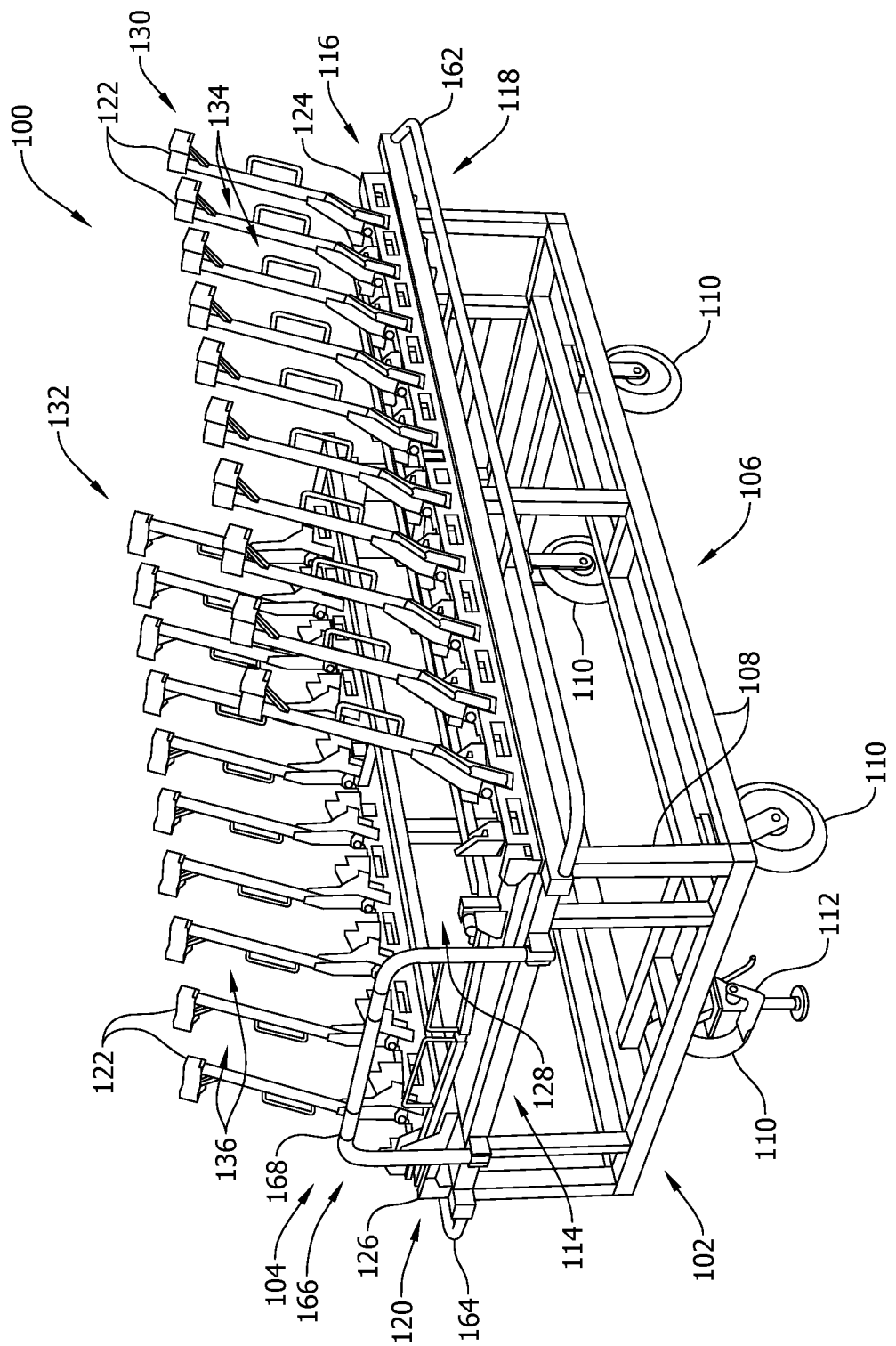
FIG. 1 is a front perspective view of an exemplary mobile cart.
Figure 2:
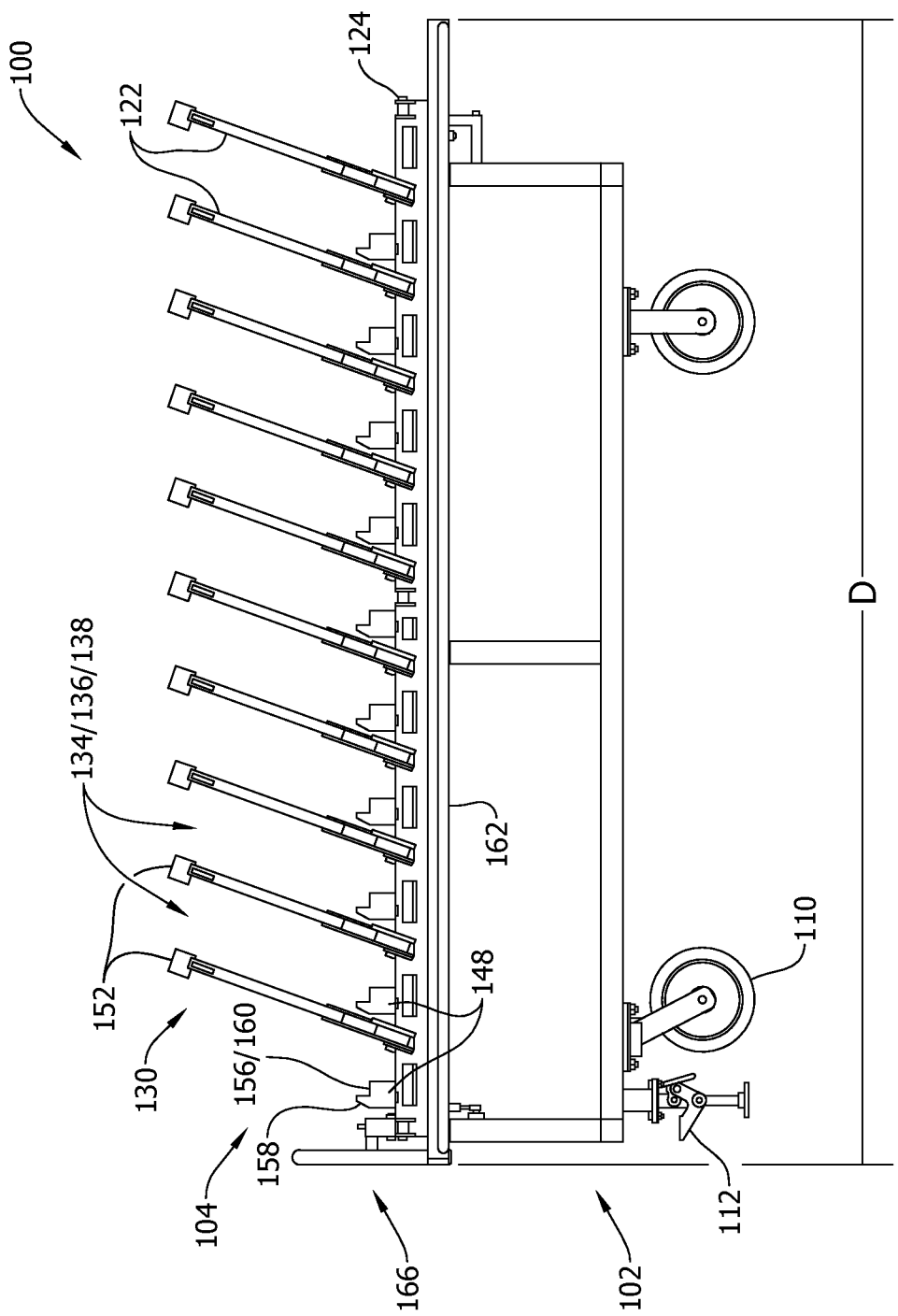
FIG. 2 is a side elevational view of the mobile cart shown in FIG. 1.
Figure 3:
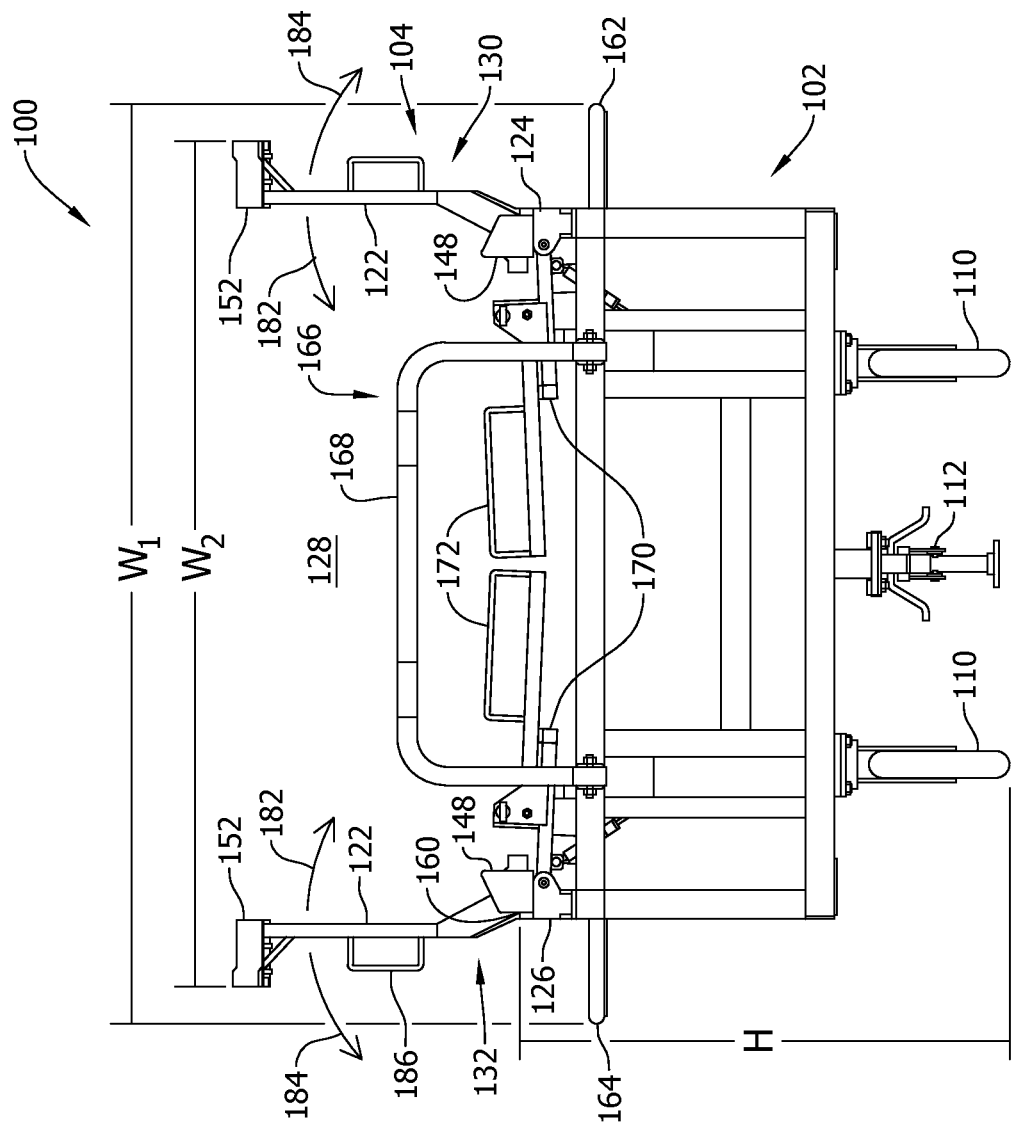
FIG. 3 is a front elevational view of the mobile cart shown in FIG. 1.

FIG. 1 is a front perspective view of an exemplary mobile cart 100, FIG. 2 is a front elevational view of mobile cart 100, and FIG. 3 is a side elevational view of mobile cart 100. In the exemplary embodiment, mobile cart 100 includes a base subassembly 102 and a storage subassembly 104 extending from base subassembly 102. Base subassembly 102 includes a frame 106 formed from a plurality of bar members 108, a plurality of wheels 110 coupled to frame 106, and a brake 112 coupled to frame 106. Bar members 108 may be fabricated from any lightweight metallic material, such as steel or aluminum, for example. Accordingly, because base subassembly 102 is fabricated from lightweight metallic materials, strength and durability of mobile cart 100 is enhanced while the weight of mobile cart 100 is maintained below a predetermined threshold. The predetermined threshold may be determined based on a number of ergonomic factors, such as a maximum push/pull strain threshold required to manually move mobile cart 100 by a technician.

Figure 6:
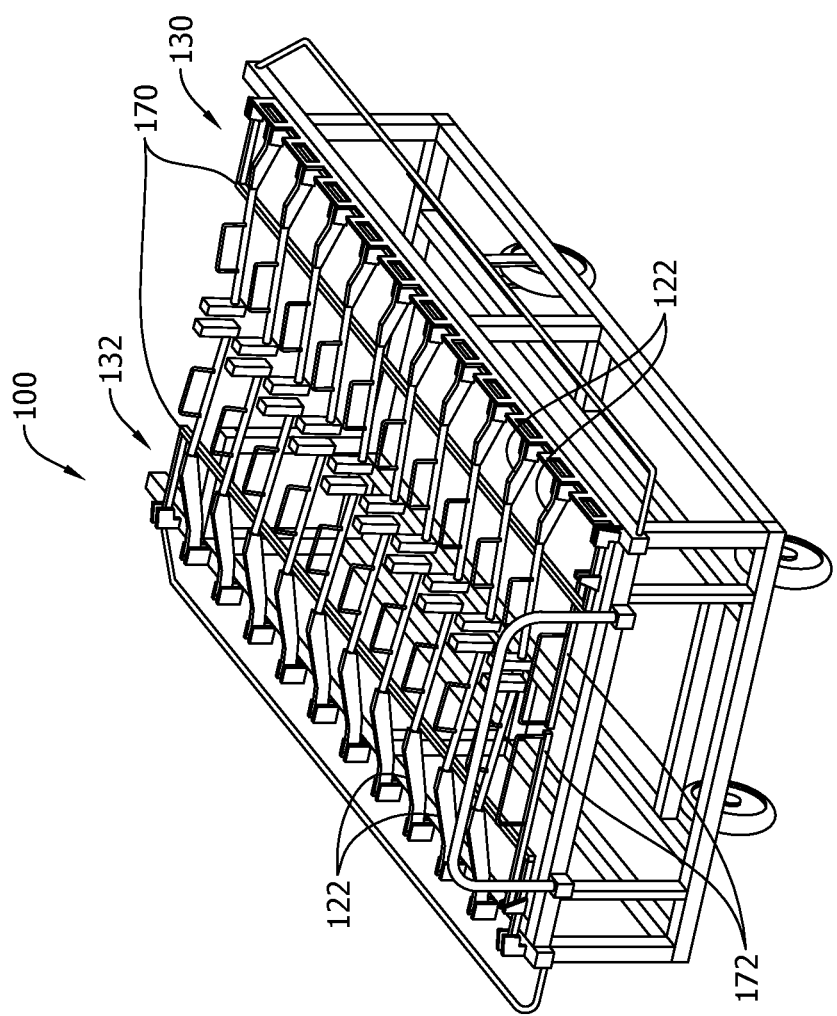
FIG. 6 is a front perspective view of the mobile cart shown in FIG. 1 with exemplary swing arms shown in a lowered position.

Base subassembly 102 includes a first end 114, a second end 116, a first side 118, and a second side 120. Storage subassembly 104 includes a plurality of swing arms 122 coupled to base subassembly 102. For example, in the exemplary embodiment, storage subassembly 104 includes a first rail 124 extending along first side 118, and a second rail 126 extending along second side 120, such that a gap 128 is defined therebetween. Swing arms 122 are arranged in a first row 130 and a second row 132, with first row 130 coupled to first rail 124, and second row 132 coupled second rail 126. As will be described in more detail below, swing arms 122 are selectively rotatable relative to the respective rails 124 and 126 for positioning swing arms 122 between an upright position as illustrated in FIGS. 1-3, and a lowered position as illustrated in FIG. 6. Alternatively, mobile cart 100 may include more than two rows of swing arms 122, and swing arms 122 may be oriented in other than non-linear orientations.

When swing arms 122 are in the upright position, a first slot 134 is defined between each swing arm 122 in first row 130, and a second slot 136 is defined between each swing arm 122 in second row 132. Referring to FIG. 2, swings arms 122 in first row 130 are substantially aligned with swing arms 122 in second row 132 axially along a length dimension D of mobile cart 100, such that slots 134 and 136 are substantially aligned with respect to each other. As such, a plurality of retention slots 138 is defined axially along cart length D. Each retention slot 138 is sized and oriented to receive a vehicle part (not shown in FIG. 2) therein, such as a hood panel or a door panel of a vehicle body. That is, the vehicle part is sized to span across mobile cart 100 and gap 128 (shown in FIG. 1) such that the part is received within a respective first slot 134 and a respective second slot 136 on opposing sides 118 and 120 of base subassembly 102.

In the exemplary embodiment, each slot 134 and 136 includes a pair of contact points 150 and 154 positioned to receive different portions of the vehicle part being inserted therein. For example, referring to FIG. 4, each vehicle part 140 has a first end 142, a second end 144, and a body portion 146 extending therebetween. A plurality of stoppers 148 define a first contact point 150, and a retaining member 152 positioned at a distal end of each swing arm 122 defines a second contact point 154. Stoppers 148 are coupled to first rail 124 and second rail 126, such that at least one stopper 148 is positioned between adjacent swing arms 122. Each stopper 148, in the exemplary embodiment, includes a base portion 156 and a stopper portion 158. Base portion 156 includes a mounting surface 160 oriented substantially horizontally, and stopper portion 158 extends substantially perpendicularly to mounting surface 160.

Each stopper 148 is spaced from a respective swing arm 122, which enables vehicle parts 140 to be oriented obliquely between contact points 150 and 154 as vehicle parts 140 are retained within a respective retention slot 138. For example, when vehicle part 140 is loaded within a respective retention slot 138, first end 142 of vehicle part 140 is received on mounting surface 160 such that stopper portion 158 restricts movement of vehicle part 140 relative to base portion 156. Vehicle part 140 may then be leaned or tilted towards the respective swing arm 122 to enable body portion 146 to be positioned against retaining member 152. In some embodiments, as shown in FIG. 2, swing arms 122 are oriented obliquely relative to base portion 156 to enable vehicle parts 140 to be received within retention slot 138 with an additional range of motion as compared to other swing arm orientations. Accordingly, positioning vehicle parts 140 obliquely between contact points 150 and 154 facilitates restricting vehicle parts 140 from tipping towards first end 142, and thus facilitates ensuring vehicle parts 140 are securely retained on mobile cart 100.

In the exemplary embodiment, stoppers 148 and/or retaining members 152 are fabricated from any material that enables mobile cart 100 to function as described herein. In one embodiment, stoppers 148 and/or retaining members 152 are fabricated from any material having a hardness less than the material of vehicle parts 140 to facilitate reducing damage to vehicle parts 140. The material may also have a coefficient of friction that restricts movement of vehicle parts 140 relative to stoppers 148 and retaining member 152. Example materials include, but are not limited to, thermoplastic materials, rubber materials, and combinations thereof.

Referring now to FIG. 3, base subassembly 102 further includes a first bumper 162 extending from first side 118, and a second bumper 164 extending from second side 120. The distance between first bumper 162 and second bumper 164 defines a width dimension $W_1$ of base subassembly 102. In addition, the distance between swing arms 122 in first row 130 and swing arms 122 in second row 132, when in the upright position, define a width dimension $W_2$ of storage subassembly 104. Width $W_1$ may be variably selected based on the size of vehicle parts 140 (shown in FIG. 4). That is, width $W_1$ of base subassembly 102 is selected to be wider than a width (not shown) of vehicle parts 140 to provide a buffer zone around mobile cart 100 for protecting vehicle parts 140 from inadvertent contact damage. Accordingly, width $W_1$ of base subassembly 102 is likewise wider than width $W_2$ of storage subassembly 104.

As described above, each stopper 148 includes mounting surface 160 in which vehicle parts 140 are received. In the exemplary embodiment, mounting surface 160 is defined at a height H from ground level. Height H is selected to be ergonomically efficient for technicians that interact with mobile cart 100. For example, height H is selected to facilitate reducing strain and unnecessary bending of the technicians when loading and/or unloading vehicle parts 140 from mobile cart 100. In one embodiment, height H is within a range between about 30 inches and about 40 inches from ground level.

Referring again to FIG. 1, base subassembly 102 further includes a handle 166 coupled at first end 114 thereof. Handle 166 includes a gripping portion 168, and is selectively rotatable relative to base subassembly 102 between a raised position and a lowered position, as will be described in more detail below. In addition, storage subassembly 104 includes a support rail 170 spaced from each of first row 130 and second row 132 of swing arms 122. Each support rail 170 extends substantially parallel to first rail 124 and second rail 126, and includes a handle 172 coupled thereto. Support rail 170 is selectively rotatable relative to first rail 124 and second rail 126, as will be described in more detail below.

Figure 4:
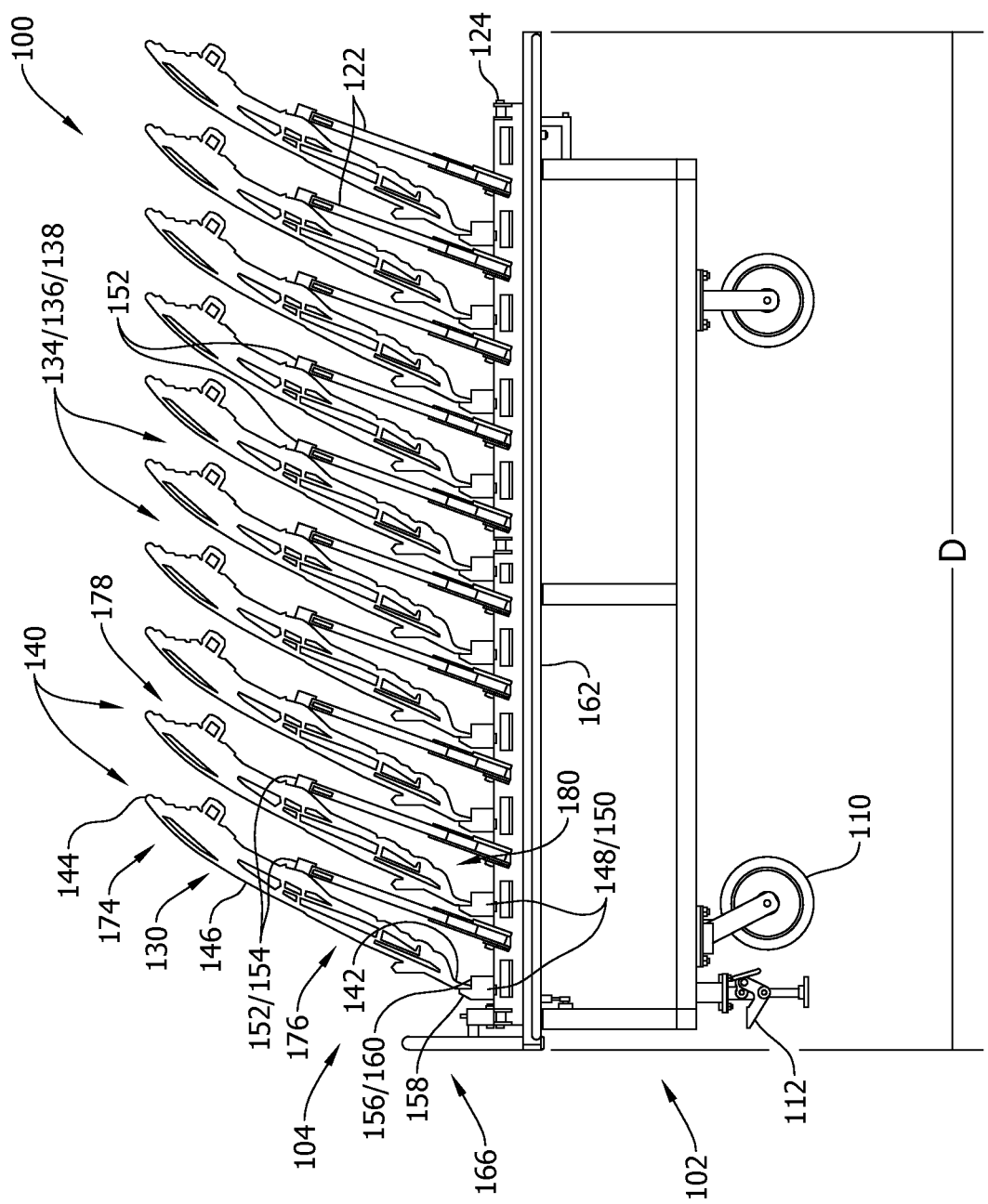
FIG. 4 illustrates the mobile cart shown in FIG. 3 having vehicle parts loaded thereon, wherein the mobile cart is shown in a first operational position.
Figure 5:
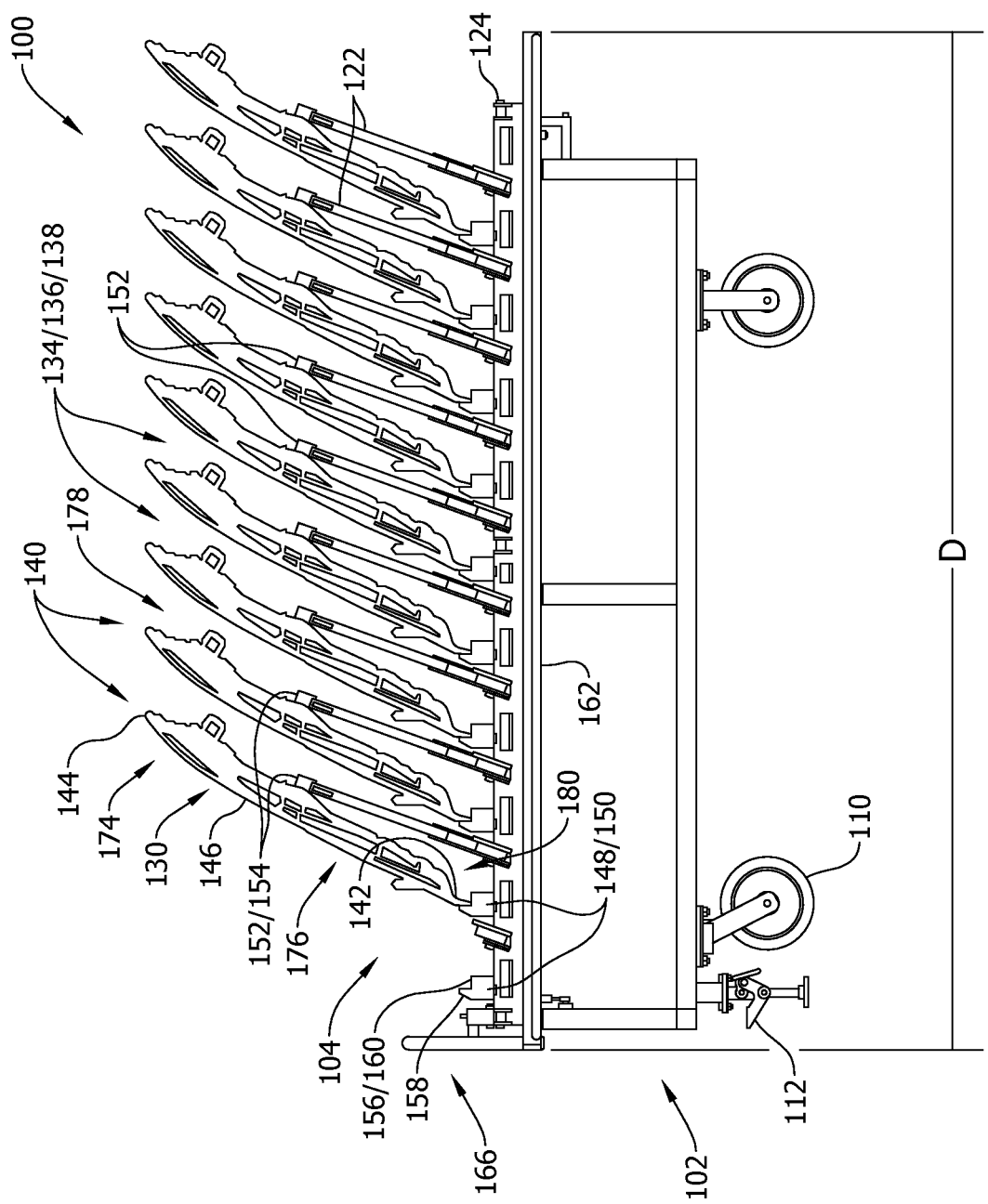
FIG. 5 illustrates the mobile cart shown in FIG. 4 in a second operational position.

FIG. 4 illustrates mobile cart 100 having vehicle parts 140 loaded thereon, wherein mobile cart 100 is shown in a first operational position, and FIG. 5 illustrates mobile cart 100 in a second operational position. FIGS. 4 and 5 illustrate an exemplary process that may be implemented to unload vehicle parts 140 from mobile cart 100. In the exemplary embodiment, a first vehicle part 174 is positioned within a first retention slot 176 at first end 114 of base subassembly 102, and a second vehicle part 178 is positioned within a second retention slot 180 that is directly adjacent to first retention slot 176. As shown in FIG. 4, handle 166 is initially in a raised position, which positions gripping portion 168 at a height that provides a technician with leverage necessary for moving mobile cart 100 in an ergonomically efficient manner. As shown in FIG. 5, handle 166 is rotated from the raised position to a lowered position to reposition gripping portion 168 below mounting surfaces 160 of stoppers 148. Accordingly, vehicle parts 140 may be loaded and/or unloaded from mobile cart 100 without being lifted over handle 166.

Referring again to FIG. 5, first vehicle part 174 is unloaded from mobile cart 100, and swing arms 122 associated with first vehicle part 174 are rotated from the upright position to the lowered position to provide substantially unimpeded access to second vehicle part 178. For example, as shown in FIG. 3, the respective swing arms 122 may be rotated in an inward rotational direction 182, relative to mobile cart 100, to be positioned in the lowered position. Second vehicle part 178 may then be unloaded from mobile cart 100, and the part unloading and swing arm lowering process repeated until all vehicle parts 140 have been unloaded from mobile cart 100. Each swing arm 122 includes a handle 186 to facilitate manual rotation of swing arms 122 relative to mobile cart 100.

Figure 7:
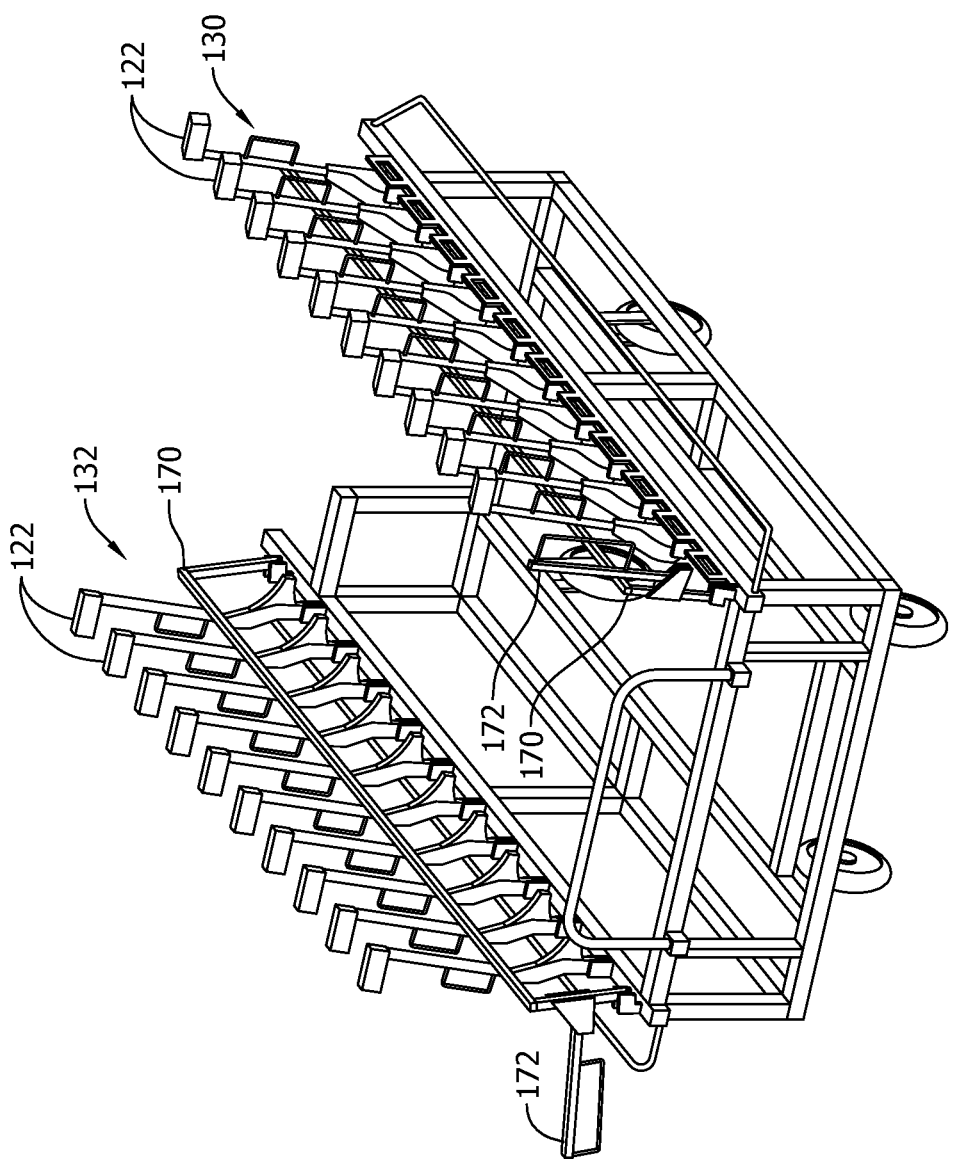
FIG. 7 illustrates an exemplary process for moving the swing arms shown in FIG. 6 from the lowered position to an upright position.

As shown in FIG. 6, swing arms 122 in first row 130 and in second row 132 extend across and rest upon a respective support rail 170 when in the lowered position. For mobile cart 100 to receive additional vehicle parts 140, swing arms 122 must be raised from the lowered position to the upright position. Each swing arm 122 may be raised individually, such as with handle 186. Alternatively, as shown in FIG. 7, a technician may grip handle 172 associated with a respective support rail 170, and may rotate handle 172 in an outward rotational direction 184 (shown in FIG. 3) relative to mobile cart 100. As described above, handle 172 is coupled to support rail 170 such that rotating handle 172 in outward rotational direction 184 likewise rotates respective support rails 170 in outward rotational direction 184. Rotating respective support rails 170 in outward rotational direction 184 facilitates simultaneously moving swing arms 122 in first row 130 and second row 132 from the lowered position to the upright position. Support rails 170 may then be rotated in inward rotational direction 182 (shown in FIG. 3) to be positioned for receiving swing arms 122 thereon.

Figure 8:
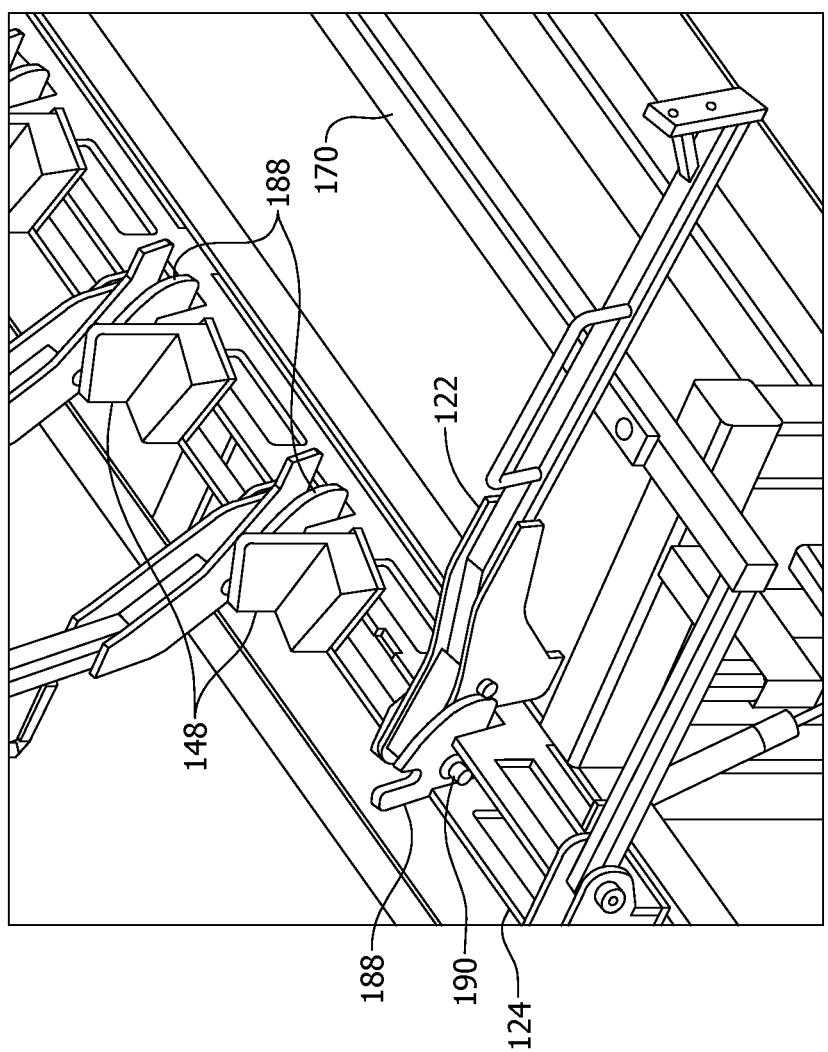
FIG. 8 is a rear perspective view of a portion of the mobile cart shown in FIG. 1.
Figure 9:
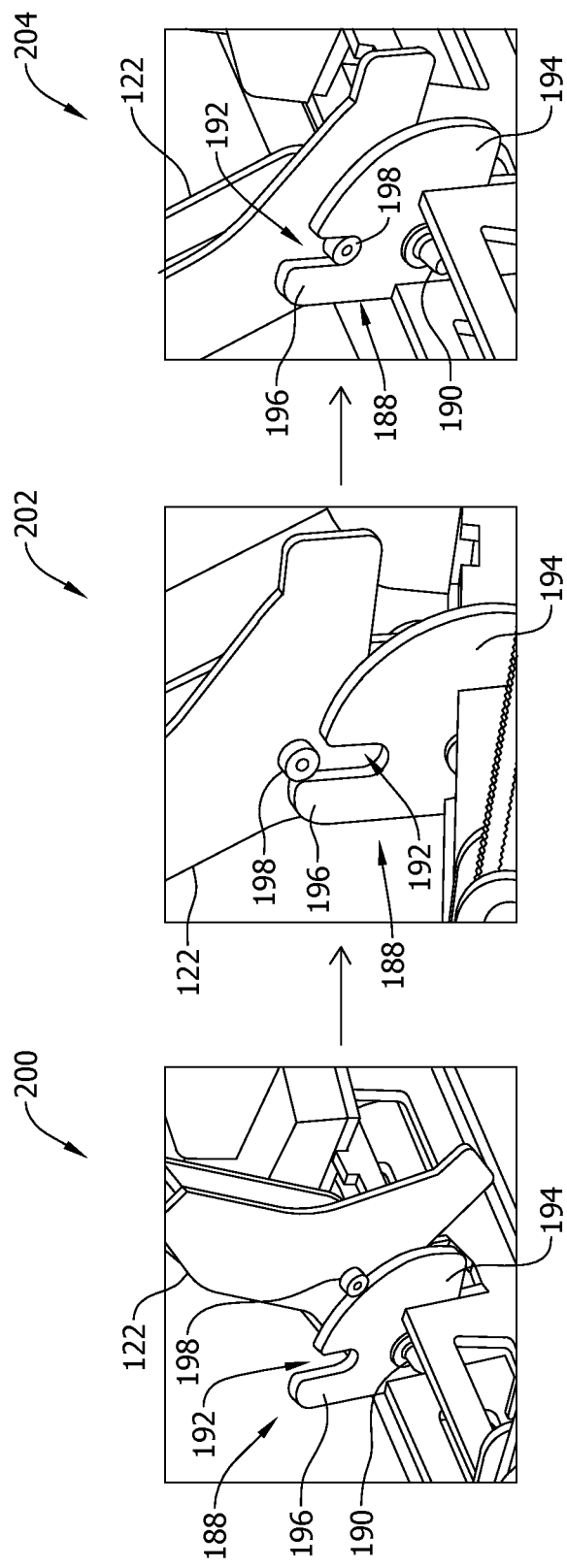
FIG. 9 illustrates an exemplary process for locking the swing arms shown in FIG. 8 in the upright position.

FIG. 8 is a rear perspective view of a portion of mobile cart 100, and FIG. 9 illustrates an exemplary process for locking swing arms 122 in the upright position. As shown in FIGS. 8 and 9, mobile cart 100 includes a locking mechanism associated with each swing arm 122 for selectively holding swing arms 122 in the upright position. In the exemplary embodiment, the locking mechanism includes a plurality of lock plates 188 coupled to first rail 124 and to second rail 126 (shown in FIG. 1). At least one swing arm 122 is coupled to each lock plate 188 with a mounting bolt 190 such that swing arms 122 are rotatable relative to respective lock plates 188. Each lock plate 188 includes a locking slot 192 defined therein. Locking slot 192 is extends between an outer guide portion 194 and a lip portion 196 of lock plate 188. Outer guide portion 194 has an arcuate outer shape. Each swing arm 122 includes a locking pin 198 that is selectively insertable within locking slot 192 for retaining swing arms 122 in the upright position.

For example, as shown in FIG. 8, the illustrated swing arm 122 is in the lowered position. When in the lowered position, swing arm 122 rests upon support rail 170, and locking pin 198 is not inserted within locking slot 192. As shown in FIG. 9, initially to lock swing arm 122 in the upright position, swing arm 122 is rotated 200 in outward rotational direction 184 (shown in FIG. 3), and locking pin 198 transitions along outer guide portion 194 as swing arm 122 is rotated in outward rotational direction 184. Thus, the shape of outer guide portion 194 enables manual rotation of swing arm 122 in outward rotational direction 184 with reduced effort and strain.

Subsequently, swing arm 122 is rotated 202 past outer guide portion 194 and is coupled against lip portion 196. In the exemplary embodiment, swing arm 122 is rotatable, and radially translatable, relative to mounting bolt 190. After swing arm 122 is fully rotated 202 past guide portion 194, swing arm 122 is at a maximum radial extension from mounting bolt 190. Lip portion 196 is sized to restrict rotational movement of swing arm 122 by being positioned to intersect the range of motion of locking pin 198 when swing arm 122 is at the maximum radial extension.

After rotating 202 swing arm 122, swing arm 122 is translated 204 radially relative to mounting bolt 190 for insertion within locking slot 192, thereby restricting rotational movement of swing arm 122 relative to lock plate 188 and locking swing arm 122 in the upright position. Locking of swing arm 122 may be achieved automatically as a result of gravity, which facilitates lowering locking pin 198 relative to mobile cart 100 for insertion within locking slot 192.

Positioning swing arm 122 from the upright position to the lowered position includes translating swing arm 122 radially to the maximum radial extension and rotating swing arm 122 in inward rotational direction 182 (shown in FIG. 3).

The embodiments described herein relate to mobile carts and methods of handling vehicle parts therewith. Vehicle parts may be loaded onto the cart and then transported to a body assembly line. At the body assembly line, the parts are unloaded by technicians for assembly on a vehicle body. The mobile cart includes features that facilitate enhancing ergonomic efficiency for the technicians performing the unloading process. For example, swing arms on the cart are selectively rotatable such that when the swing arms are upright, they create holding capacity for individual vehicle parts. Similarly, when the swing arms are lowered they, unimpeded access is provided to the next vehicle part on the cart. Accordingly, the mobile cart facilitates reducing workplace injuries to the technicians.

Exemplary embodiments of a mobile cart are described above in detail. Although the mobile carts herein are described and illustrated in association with vehicle panel delivery, the invention is also intended for use in ergonomically delivering any plurality of objects. Moreover, it should also be noted that the components of the invention are not limited to the specific embodiments described herein, but rather, aspects of each component may be utilized independently and separately from other components and methods described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mobile cart for use in handling vehicle parts, the mobile cart comprising:
    a base subassembly comprising a first side and a second side; and
    a storage subassembly coupled to the base subassembly, the storage subassembly comprising:
        a first row of swing arms extending along the first side of the base subassembly; and
        a second row of swing arms extending along the second side of the base subassembly, wherein the swing arms in the first row and the second row are variably positionable between an upright position and a lowered position, and wherein, when in the upright position, a first slot is defined between each swing arm in the first row, and a second slot is defined between each swing arm in the second row, wherein a respective first slot is axially aligned with a respective second slot relative to the mobile cart such that a plurality of retention slots are defined that are oriented and sized to receive a vehicle part therein, wherein the swing arms are oriented obliquely relative to the mobile cart.

2. The mobile cart in accordance with claim 1, wherein the storage subassembly further comprises:
    a first rail extending along the first side of the base subassembly, the first row of swing arms coupled to the first rail;
    a second rail extending along the second side of the base subassembly, the second row of swing arms coupled to the second rail; and
    a plurality of lock plates coupled to the first rail and the second rail, wherein each swing arm is coupled to a respective lock plate, wherein each respective swing arm is selectively engageable with the respective lock plate for retaining each respective swing arm in the upright position.

3. The mobile cart in accordance with claim 2, wherein each lock plate comprises a locking slot, and each swing arm comprises a locking pin selectively insertable within the locking slot for retaining each respective swing arm in the upright position.

4. The mobile cart in accordance with claim 1, wherein the storage subassembly further comprises:
    a first rail extending along the first side of the base subassembly, the first row of swing arms coupled to the first rail;
    a second rail extending along the second side of the base subassembly, the second row of swing arms coupled to the second rail; and
    a plurality of stoppers coupled to the first rail and the second rail, wherein a respective stopper is associated with each swing arm, and the respective stopper and a portion of each respective swing arm define contact points configured to retain the vehicle part therebetween.

5. The mobile cart in accordance with claim 1, wherein the storage subassembly further comprises a support rail spaced from the first row and the second row, wherein the support rail is configured to receive each swing arm when in the lowered position, and wherein the support rail is configured to simultaneously move the swing arms from the lowered position to the upright position.

6. The mobile cart in accordance with claim 1, wherein the base subassembly further comprises a first bumper extending from the first side thereof, and a second bumper extending from the second side thereof, wherein a width defined between the first and second bumpers is wider than a width of the storage subassembly.

7. The mobile cart in accordance with claim 1, wherein the storage subassembly comprises a mounting surface configured to receive the vehicle part thereon, the mounting surface defined at a height of between about 30 inches to about 40 inches above ground level.

8. The mobile cart in accordance with claim 7 further comprising a handle coupled to the base subassembly, the handle comprising a gripping portion, wherein the handle is moveable to selectively position the gripping portion higher than or lower than the mounting surface.

9. A mobile cart for use in handling vehicle parts, the mobile cart comprising:
    a first rail extending along the first side of the mobile cart;
    a first row of swing arms coupled to the first rail;
    a second rail extending along the second side of the mobile cart;
    a second row of swing arms coupled to the second rail, wherein the swing arms in the first row and the second row are selectively positionable between an upright position and a lowered position; and
    a plurality of stoppers coupled to the first rail and the second rail, wherein a respective stopper is associated with each swing arm, and the respective stopper and a portion of each respective swing arm define contact points configured to retain the vehicle part therebetween.

10. The mobile cart in accordance with claim 9, wherein, when in the upright position, a first slot is defined between each swing arm in the first row, and a second slot is defined between each swing arm in the second row, wherein a respective first slot is axially aligned with a respective second slot relative to the mobile cart such that a plurality of retention slots are defined that are oriented and sized to receive a vehicle part therein.

11. The mobile cart in accordance with claim 9 further comprising a plurality of lock plates coupled to the first rail and the second rail, wherein each swing arm is coupled to a respective lock plate, wherein each respective swing arm is selectively engageable with the respective lock plate for retaining each respective swing arm in the upright position.

12. The mobile cart in accordance with claim 11, wherein each lock plate comprises a locking slot, and each swing arm comprises a locking pin selectively insertable within the locking slot for retaining each respective swing arm in the upright position.

13. The mobile cart in accordance with claim 9 further comprising a support rail spaced from the first row and the second row, wherein the support rail is configured to receive each swing arm when in the lowered position, and wherein the support rail is configured to simultaneously move the swing arms from the lowered position to the upright position.

14. The mobile cart in accordance with claim 9 further comprising a mounting surface configured to receive the vehicle part thereon, the mounting surface defined at a height of between about 30 inches to about 40 inches above ground level.

15. The mobile cart in accordance with claim 14 further comprising a handle coupled having a gripping portion, wherein the handle is moveable relative to the mobile cart to selectively position the gripping portion higher than or lower than the mounting surface.

16. A method of handling vehicle parts, the method comprising:
loading a plurality of vehicle parts onto a mobile cart, wherein each vehicle part is positioned within a respective retention slot of a plurality of retention slots on the mobile cart, the plurality of retention slots defined by a plurality of swings arms in an upright position and arranged in a first row and a second row along the mobile cart, wherein a first slot is defined between each swing arm in the first row, and a second slot is defined between each swing arm in the second row, wherein a respective first slot is axially aligned with a respective second slot along the mobile cart to define the plurality of retention slots;
unloading a first vehicle part from the mobile cart, the first vehicle part positioned within a first retention slot; and
positioning the swing arms associated with the first retention slot from the upright position to a lowered position to provide access to a second vehicle part positioned within a second retention slot that is positioned adjacent to the first retention slot.

17. The method in accordance with claim 16 further comprising repeating the unloading and positioning until each of the plurality of vehicle parts is unloaded from the mobile cart.

18. The method in accordance with claim 16, wherein the plurality of swing arms are received on a support rail when in the lowered position, the method further comprising rotating the support rail for simultaneously moving the plurality of swing arms from the lowered position to the upright position.

19. The method in accordance with claim 16, wherein the mobile cart further includes a handle selectively positionable between a raised position and a lowered position, the method further comprising moving the handle to the lowered position to provide access to the first retention slot positioned adjacent to the handle.

* * * * *